(12) United States Patent
Takahashi et al.

(10) Patent No.: US 9,686,756 B2
(45) Date of Patent: Jun. 20, 2017

(54) WIRELESS COMMUNICATION APPARATUS AND WIRELESS COMMUNICATION METHOD

(71) Applicant: Sharp Kabushiki Kaisha, Osaka-shi, Osaka (JP)

(72) Inventors: Hiroki Takahashi, Osaka (JP); Jungo Goto, Osaka (JP); Osamu Nakamura, Osaka (JP); Kazunari Yokomakura, Osaka (JP); Yasuhiro Hamaguchi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/759,780

(22) PCT Filed: Nov. 22, 2013

(86) PCT No.: PCT/JP2013/081540
§ 371 (c)(1),
(2) Date: Jul. 8, 2015

(87) PCT Pub. No.: WO2014/109136
PCT Pub. Date: Jul. 17, 2014

(65) Prior Publication Data
US 2015/0351050 A1    Dec. 3, 2015

(30) Foreign Application Priority Data
Jan. 9, 2013    (JP) .................................. 2013-001526

(51) Int. Cl.
*H04W 52/34* (2009.01)
*H04W 16/32* (2009.01)
(Continued)

(52) U.S. Cl.
CPC ......... *H04W 52/346* (2013.01); *H04W 16/32* (2013.01); *H04W 52/146* (2013.01);
(Continued)

(58) Field of Classification Search
CPC ........................... H04W 52/346; H04W 88/08
See application file for complete search history.

(56) References Cited

U.S. PATENT DOCUMENTS 8,711,789 B2 * 4/2014 Ratasuk ............ H04W 74/0866
370/329
9,179,423 B2 * 11/2015 Vujcic ..................... H04L 5/001
(Continued)

FOREIGN PATENT DOCUMENTS

JP    2012-216969 A    11/2012

OTHER PUBLICATIONS

3GPP RAN WS on Rel-12 and onwards, RWS-120003, Ljubljana, Slovenia, Jun. 11-12, 2012, "LTE Release 12 and Beyond".
(Continued)

*Primary Examiner* — Bobbak Safaipour
(74) *Attorney, Agent, or Firm* — Birch, Stewart, Kolasch & Birch, LLP (57) ABSTRACT

There is provided a wireless communication apparatus which achieves high efficiency in power use in such a manner that transmission power is adequately distributed in simultaneous transmission to multiple base stations. The wireless communication apparatus provided by the present invention, at the same time, transmits a first data signal to a first base station apparatus by using a first CC and transmits a second data signal to a second base station apparatus by using a second CC. The wireless communication apparatus includes a transmission-power controller that scales transmission power by using different scaling factors for the first data signal and the second data signal, when the sum of
(Continued)

transmission power of the first data signal and transmission power of the second data signal is larger than a predetermined value. The transmission power of the first data signal is calculated to obtain predetermined reception power in the first base station apparatus. The transmission power of the second data signal is calculated to obtain predetermined reception power in the second base station apparatus.

8 Claims, 8 Drawing Sheets

(51) Int. Cl.
  *H04W 52/14* (2009.01)
  *H04W 52/24* (2009.01)
  *H04W 52/36* (2009.01)
  *H04W 52/40* (2009.01)
  *H04W 88/08* (2009.01)
  *H04L 5/00* (2006.01)

(52) U.S. Cl.
  CPC ....... *H04W 52/245* (2013.01); *H04W 52/247* (2013.01); *H04W 52/34* (2013.01); *H04W 52/362* (2013.01); *H04W 52/367* (2013.01); *H04W 52/40* (2013.01); *H04L 5/0007* (2013.01); *H04W 88/08* (2013.01)

(56) References Cited

U.S. PATENT DOCUMENTS

| 2011/0237288 A1* | 9/2011 | Ratasuk | H04W 52/146 455/522 |
| 2015/0163754 A1* | 6/2015 | Konuskan | H04W 72/0473 455/522 |

OTHER PUBLICATIONS

3GPP TSG RAN WG3 Meeting #63bis, "Impact of CA in LTE-A on RAN3", R3-090810, Huawei, 13.3, Seoul, Korea, Mar. 23-26, 2009, pp. 1-3.

3GPP TSG-RAN Meeting#58, "New Study Item Description: Small Cell enhancements for E-UTRA and E-UTRAN—Higher-layer aspects", NTT Docomo, Inc., 13.2, RP-122033, Barcelona, Spain, Dec. 4-7, 2012.

Ericsson, "Views on Rel-12", RES-120003, Ericsson AB 2012, Jun. 1, 2012, pp. 1-12.

* cited by examiner

WIRELESS COMMUNICATION APPARATUS AND WIRELESS COMMUNICATION METHOD

TECHNICAL FIELD

The present invention relates to a wireless communication apparatus and a wireless communication method.

BACKGROUND ART

The 3GPP (The Third Generation Partnership Project) which is one of standardization organizations has almost completed the standardization of 3GPP LTE (Long Term Evolution) Rel-10 (systems developed after this may be referred to as LTE-A (LTE Advanced)) which is one of the fourth-generation mobile communication systems, and is currently standardizing LTE Rel-11 which is obtained by enhancing Rel-10.

In carrier aggregation (CA) which is a key technique for improving a transmission speed after Rel-10, multiple LTE carriers called component carriers (CCs) are used at the same time for communication, achieving broadband transmission with a bandwidth exceeding 20 MHz.

For the uplink (communication from a terminal (which may be referred to as a user equipment (UE), a mobile station apparatus, or a wireless terminal) to a base station) of LTE Rel-11, a study is progressing for a heterogeneous network in which a macro base station (evolved Node B (eNB)) forming a macro cell (macro area) covering an area equivalent to that of a cellular system of the related art and an LPN (a low power node which may be also referred to as a radio remote head (RRH)) forming a small cell covering a narrow area in the macro cell are disposed. In the heterogeneous network, the macro base station and the LPN which serve as independent cells utilize radio resources, whereby cell-splitting gain (area-splitting gain) may be obtained.

The study for Rel-12 which is the succeeding standard of Rel-11 has been also started. Transmission in a small cell using a carrier frequency which is different from that in a macro cell is being studied (for example, NPL 1). In this case, the macro base station may offload the data traffic to the small cell. Therefore, a macro base station instructs a terminal which needs high-speed data transmission to be connected to an LPN, whereby traffic may be offloaded, and throughput (capacity) in the macro cell constituted by the macro base station and the LPN may be increased. Using the CA technique described above, specification of dual connectivity in which, while a connection to a macro cell is established, a connection to a small cell is established by using a different CC at the same time is being studied (for example, NPL 2).

CITATION LIST

Non Patent Literature

NPL 1: Ericsson, RWS-120003, 3GPP RAN Workshop on Rel-12 and onwards, June, 2012.

NPL 2: NTT DOCOMO, RP-122033, New Study Item Description: Small Cell enhancements for E-UTRA and E-UTRAN—Higher-layer aspects.

SUMMARY OF INVENTION

Technical Problem

Distribution of transmission power with a certain ratio in the CA using multiple CCs has been studied. However, distribution of transmission power to a signal transmitted to a certain base station, with high priority in simultaneous connection established to multiple base stations has not been studied.

The present invention is made in view of the situation described above, and an object thereof is to provide a wireless communication apparatus achieving high efficiency in power use in such a manner that the transmission power is adequately distributed in simultaneous transmission to multiple base stations.

Solution to Problem (1) The present invention is made in order to solve the above-described problem. According to an aspect of the present invention, there is provided a wireless communication apparatus which, at the same time, transmits a first data signal to a first base station apparatus by using a first CC and transmits a second data signal to a second base station apparatus by using a second CC. The wireless communication apparatus includes a transmission-power controller that scales transmission power by using different scaling factors for the first data signal and the second data signal, when the sum of transmission power of the first data signal and transmission power of the second data signal is larger than a predetermined value. The transmission power of the first data signal is calculated to obtain predetermined reception power in the first base station apparatus. The transmission power of the second data signal is calculated to obtain predetermined reception power in the second base station apparatus.

(2) According to another aspect of the present invention, in the above-described wireless communication apparatus, the predetermined value indicates maximum transmission power available in data transmission in the wireless communication apparatus.

(3) According to another aspect of the present invention, in the above-described wireless communication apparatus, when the wireless communication apparatus transmits a control signal to the first base station apparatus or the second base station apparatus, the transmission-power controller distributes transmission power to the control signal, the transmission power being set in order to obtain predetermined reception power in the base station apparatus receiving the control signal, and uses the remaining transmission power as the maximum transmission power available in the data transmission.

(4) According to another aspect of the present invention, in the above-described wireless communication apparatus, the transmission-power controller distributes transmission power available in the wireless communication apparatus, by giving priority to the first data signal or the second data signal.

(5) According to another aspect of the present invention, in the above-described wireless communication apparatus, transmission power is distributed with high priority to a data signal transmitted to a base station apparatus having smaller propagation loss among propagation loss between the first base station apparatus and the wireless communication apparatus and propagation loss between the second base station apparatus and the wireless communication apparatus.

(6) According to another aspect of the present invention, there is provided a wireless communication method in a wireless communication apparatus which, at the same time, transmits a first data signal to a first base station apparatus by using a first CC and transmits a second data signal to a second base station apparatus by using a second CC. The method includes scaling transmission power by using different scaling factors for the first data signal and the second data signal, when the sum of transmission power of the first data signal and transmission power of the second data signal is larger than a predetermined value. The transmission power of the first data signal is calculated to obtain predetermined reception power in the first base station apparatus. The transmission power of the second data signal is calculated to obtain predetermined reception power in the second base station apparatus.

Advantageous Effects of Invention

By using the wireless communication apparatus according to the present invention, in a wireless communication system including a macro base station, an LPN, and the wireless communication apparatus, adequate weighting is performed on the transmission power for a signal transmitted to the macro base station and that for a signal transmitted to the LPN, achieving wireless transmission of high efficiency in power use.

DESCRIPTION OF EMBODIMENTS

Embodiments described below will be described under the assumption that a wireless communication system which includes a macro base station, an LPN, and a terminal and which is used in a 3GPP system is used. However, the scope in which the present invention is applied is not limited to this. For example, characteristics of a terminal which are indicated in the embodiments described below are applicable to any wireless communication apparatus which simultaneously transmits signals to multiple wireless communication apparatuses.

Figure 1:
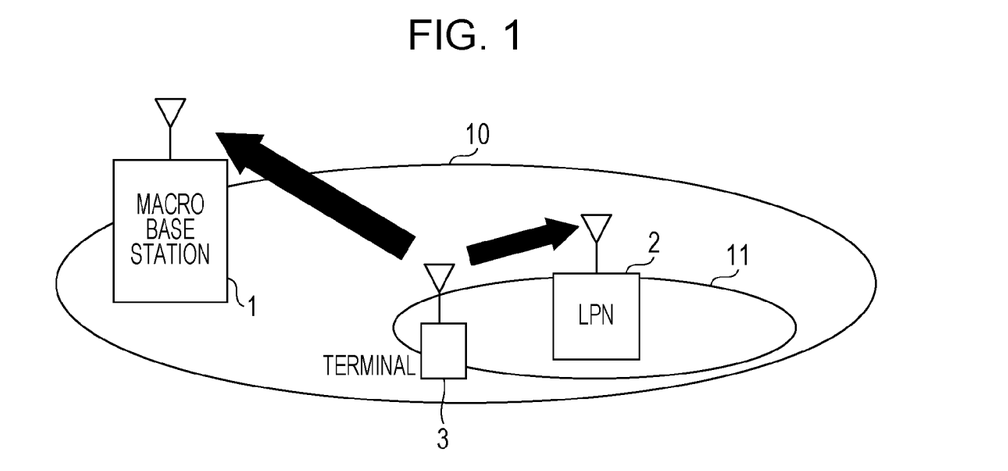
FIG. 1 is a schematic view illustrating an exemplary cellular system according to the present invention.

FIG. 1 is a schematic view of a cellular system according to the present invention. In FIG. 1, similarly to a cellular system of the related art, a macro base station 1 forms a macro cell 10 which is an area covering a wide area. An LPN 2 is disposed in the macro cell 10 formed by the macro base station 1, and forms a small cell 11 having a small cell radius in the macro cell 10. A terminal 3 located in the small cell 11 transmits an uplink signal to the macro base station 1 and the LPN 2 through uplinks. In this example, the terminal 3 transmits a signal to the macro base station 1 by using CC1 as a transmission band, and transmits a signal to the LPN 2 by using CC2.

When such a cellular system conforms to the 3GPP specification of the related art, in transmission power control over the terminal 3 which is exerted when a data signal PUSCH (Physical Uplink Shared CHannel) is transmitted, the desired transmission power of the cth CC (which may be referred to as a cell) is controlled by using the following expression (1).

[Math 1]

$$P_{PUSCH,c}(i) = \min\left\{ \begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\} \quad (1)$$

Expression (1) is expressed in decibels. The function min is a function which returns the minimum element among the arguments. The symbol $P_{CMAX,c}(i)$ represents the maximum transmission power which may be allocated to the cth CC by the terminal; c represents a CC index; i represents a sub-frame number with which the PUSCH which is the control target is transmitted; and $M_{PUSCH,c}(i)$ represents the number of resource blocks (RBs) used in the PUSCH transmission (an RB is a minimum allocation unit constituted by multiple subcarriers). The symbol j takes different values depending on a method in which radio resources for PUSCH are scheduled and which is employed by the terminal. When semi-persistent scheduling in which radio resources are allocated at certain periodic intervals is employed, j=0. When dynamic scheduling in which radio resources are dynamically allocated is employed, j=1. When a random access preamble (a signal transmitted to the base station by the terminal at first in order to establish synchronization in the uplink between the base station and the terminal) is to be transmitted, j=2. The symbol $P_{O\#PUSCH,c}(j)$ represents a value which serves as a reference of reception power in the base station, and is determined by the sum of $P_{O\#NOMINCAL\#PUSCH,c}(j)$ which is transmitted as a common value for all of the cells through a higher layer from the base station, and $P_{O\#UE\#PUSCHH,c}(j)$ which is transmitted to each terminal. The symbol $\alpha_c(j)$ represents a value transmitted from the base station to the terminal as a coefficient multiplied by a path loss; when j=0 or j=1, one of {0, 0.4, 0.5, 0.6, 0.7, 0.8, 0.9, 1} is selected; and, when j=2, 1 is used. The symbol $PL_c$ represents a value of propagation loss (path loss) estimated by the terminal by using a reference signal transmitted through a downlink; $\Delta_{TF,c}(i)$ represents a value determined by a modulation system and/or a coding system used by the terminal; and $f_c(i)$ represents a TPC command (control value for transmission power) used in closed-loop transmission power control and is transmitted from a base station.

Expression (1) has the following meaning. When a terminal transmits PUSCH by using the cth CC, transmission power for meeting a certain reception level in a base station is calculated. When the transmission power is smaller than the maximum transmission power $P_{CMAX,c}(i)$ for PUSCH which is allowable in the terminal, the transmission power is set as the desired transmission power of the cth CC. When the transmission power is larger than $P_{CMAX,c}(i)$, $P_{CMAX,c}(i)$ is set as the desired transmission power of the cth CC.

The symbol $P_{CMAX,c}(i)$ (a true value (linear value) is represented by $p_{CMAX,c}(i)$) in Expression (1) represents the maximum transmission power in each CC. The maximum transmission power $P_{CMAX}(i)$ (a decibel value is represented by $P_{CMAX}(i)$) of the terminal is equal to or smaller than the sum of the values $p_{CMAX,c}(i)$ of all of the CCs. Therefore, when the sum of the values $p_{PUSCH,c}(i)$ (true value of $P_{PUSCH,c}(i)$) of all of the CCs is larger than $p_{CMAX}(i)$, power scaling is performed so that the following expression (2) is satisfied.

[Math 2]

$$\sum_c w(i) \cdot p_{PUSCH,c}(i) \leq p_{CMAX}(i) \qquad (2)$$

The symbol w(i) represents a scaling factor which is equal to or larger than 0 and equal to or smaller than 1, and is set so that Expression (2) is satisfied. Thus, the transmission power in each CC is scaled.

Figure 2:
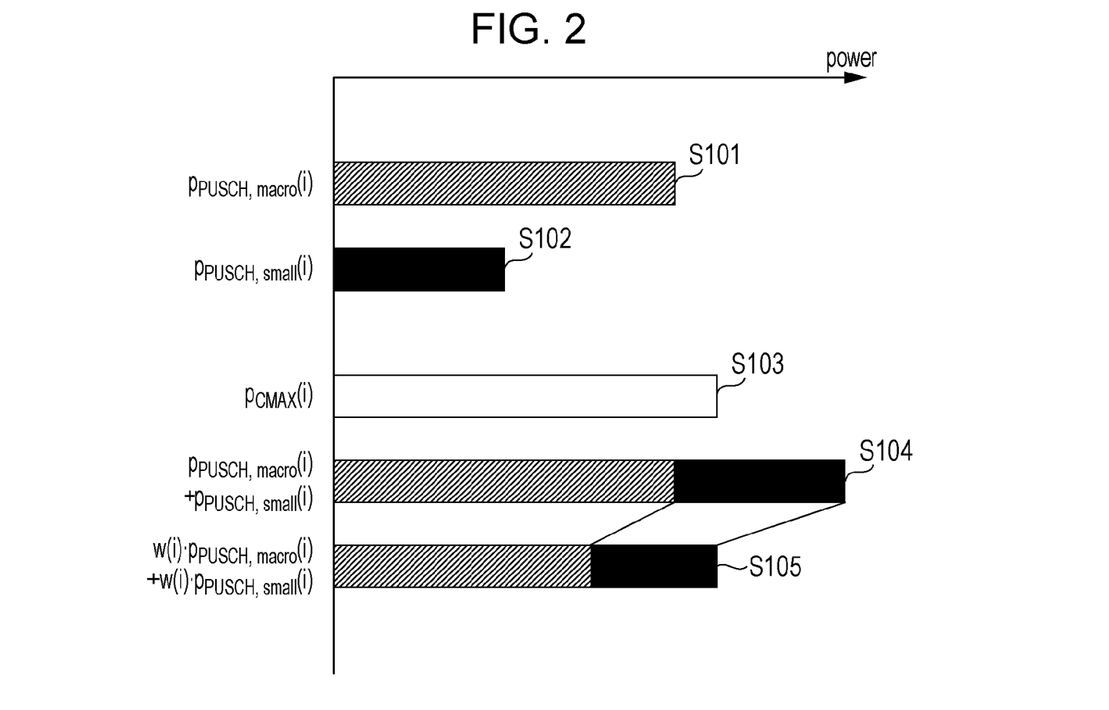
FIG. 2 is a diagram illustrating exemplary scaling performed when the sum of desired transmission power of a signal to be transmitted to a macro base station and that of a signal to be transmitted to an LPN exceeds the maximum transmission power of a terminal.

A case in which the transmission power control using Expressions (1) and (2) described above is applied to simultaneous transmission to a macro base station and an LPN is assumed. Simultaneous transmission indicates a situation in which signals are instantaneously transmitted to multiple base stations, and it is not necessary to synchronize the timings at which a frame is transmitted, in the signals transmitted to two base stations. The CC used in transmission to the macro base station is denoted by using c=macro, and the CC used in transmission to the LPN is denoted by using c=small. The desired transmission power calculated by using Expression (1) for the CC for the macro base station is represented by $P_{PUCSH,macro}(i)$, and that for the LPN, by $P_{PUSCH,small}(i)$. At that time, in the case where the terminal 3 is located closer to the LPN 2 than the macro base station 1 (that is, $PL_{macro} \gg PL_{small}$), and where the number of RBs for the CC for the macro base station 1 is not so different from that for the LPN 2, $p_{PUSCH,macro}(i) \gg p_{PUSCH,small}(i)$. An example of such a situation is illustrated in FIG. 2. In FIG. 2, the horizontal axis represents power, and $p_{PUSCH,macro}(i)$ (S101) is larger than $p_{PUSCH,small}(i)$ (S102). When the maximum transmission power $p_{CMAX}(i)$ (S103) of the terminal 3 is smaller than $(p_{PUSCH,macro}(i)+p_{PUSCH,small}(i))$ (S104), scaling is performed so that Expression (2) is satisfied. The scaling factor w(i) is set so that $(w(i) \cdot p_{PUSCH,macro}(i)+w(i) \cdot p_{PUSCH,small}(i))$ (S105) is made equal to or smaller than $p_{CMAX}(i)$. A value lower than that of the desired transmission power calculated by using Expression (1) is set to the signal for each of the CCs. Therefore, the reception stations fail to receive sufficient power, increasing the probability that retransmission needs to be performed due to a frame error.

In the embodiments described below, in consideration of the situation in which transmissions from the terminal to the base stations use different values of desired transmission power, scaling using different scaling factors for transmission signals transmitted to the base stations will be described.

First Embodiment

In the present embodiment, the following case is assumed. The area of the small cell 11 illustrated in FIG. 1 is sufficiently small. When the terminal 3 is connected to the LPN, the expression $P_{PUSCH,macro}(i) > P_{PUSCH,small}(i)$ holds in the desired transmission power calculated by using Expression (1). When $p_{PUSCH,macro}(i)+p_{PUSCH,small}(i) > p_{CMAX}(i)$, the terminal according to the present embodiment sets the scaling factor w(i) so that the following expression (3) is satisfied.

[Math 3]

$$w(i) \cdot p_{PUSCH,macro}(i) \leq p_{CMAX}(i) - p_{PUSCH,small}(i) \qquad (3)$$

Figure 3:
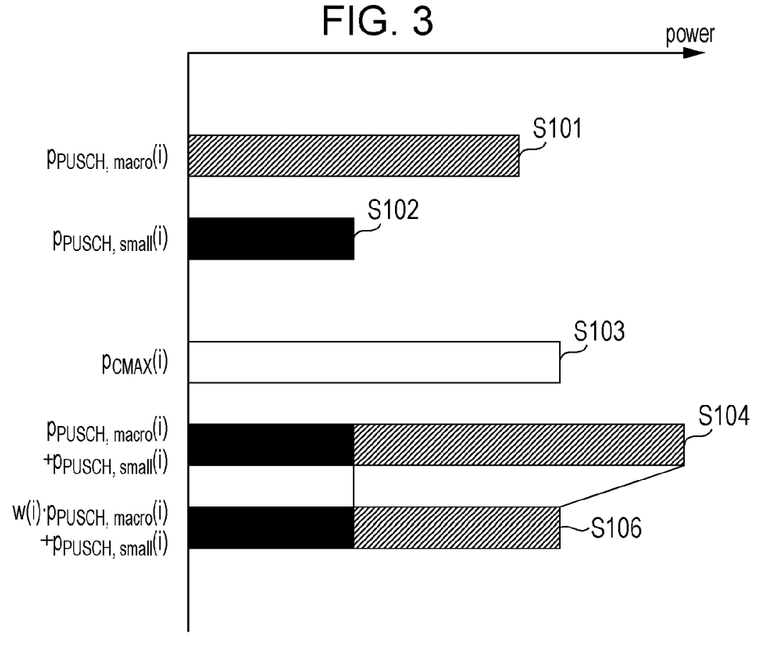
FIG. 3 is a diagram illustrating exemplary transmission power used when scaling according to a first embodiment of the present invention is performed.

Expression (3) indicates that, after the transmission power of a signal to an LPN is allocated with high priority, the transmission power of a signal to a macro base station is set within the surplus power. FIG. 3 illustrates scaling of this case by using conditions similar to those in FIG. 2. In FIG. 3, similarly to the case in FIG. 2, the maximum transmission power $p_{CMAX}(i)$ (S103) of the terminal 3 is smaller than $(p_{PUSCH,macro}(i)+p_{PUSCH,small}(i))$ (S104). When scaling using Expression (3) is applied, in $(w(i) \cdot p_{PUSCH,macro}(i)+p_{PUSCH,small}(i))$ (S106) obtained through scaling, $p_{PUSCH,small}(i)$ (S102) which is the desired transmission power of a signal to the LPN remains as it is. The scaling factor w(i) for the macro base station is smaller than that in the case in FIG. 2. Since $p_{PUSCH,macro}(i)$ (S101) is larger than $p_{PUSCH,small}(i)$ (S102), the reduction in transmission power may be relatively suppressed. As a result, without increasing the error rate of a signal received by the macro base station dramatically, transmission quality in the small cell in which transmission may be performed with low transmission power may be insured.

Figure 4:
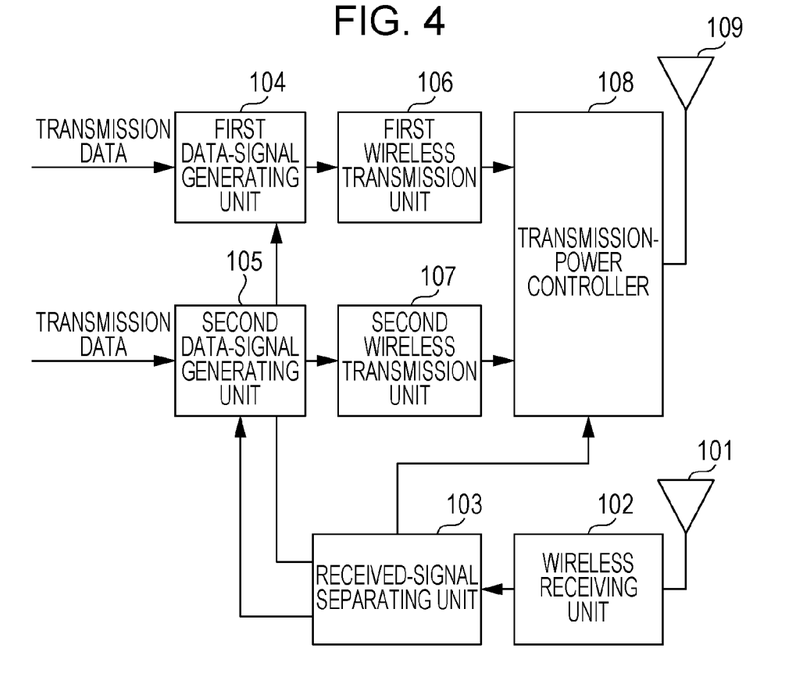
FIG. 4 is a schematic view illustrating an exemplary configuration of a terminal according to the first embodiment of the present invention.

FIG. 4 illustrates an exemplary configuration of a terminal according to the first embodiment of the present invention. In this example, as in the cellular system illustrated in FIG. 1, description will be made under the assumption that the terminal 3 connected to the macro base station 1 and the LPN 2 is used.

The terminal includes a reception antenna 101, a wireless receiving unit 102, a received-signal separating unit 103, a first data-signal generating unit 104, a second data-signal generating unit 105, a first wireless transmission unit 106, a second wireless transmission unit 107, a transmission-power controller 108, and a transmission antenna 109. In FIG. 4, one transmission antenna and one reception antenna are illustrated. However, multiple antennas may be provided, and a known MIMO (Multiple Input Multiple Output) technique may be applied. Alternatively, one antenna may provide the transmission antenna function and the reception antenna function.

Signals transmitted from the macro base station apparatus and the LPN which are connection target of the terminal are received by the wireless receiving unit 102 via the reception antenna 101. When the carrier frequency of the signal transmitted from the macro base station is different from that from the LPN, the reception antenna 101 has such a configuration that the reception antenna 101 is capable of receiving signals having the carrier frequencies.

The wireless receiving unit 102 performs, for example, downconversion to the baseband from a carrier frequency and A/D (Analog to Digital) conversion, and inputs the resulting signal to the received-signal separating unit. When multiple carrier frequencies are used, downconversion may be performed by using different circuits corresponding to the carrier frequencies.

From received signals, the received-signal separating unit 103 extracts control information that includes allocated frequencies and MCS (Modulation and Coding Schemes) applied to a signal transmitted to the macro base station and a signal transmitted to the LPN, and that also includes control values of transmission power (which may be referred to as TPC (Transmit Power Control) commands). Among the extracted pieces of control information, the MCS and the allocated frequency of a signal transmitted to the macro base station are input to the first data-signal generating unit 104, and those of a signal transmitted to the LPN are input to the second data-signal generating unit 105. Among the pieces of control information, the number of resources for the allocated frequencies and the transmission power control values for the signals transmitted to the macro base station and the LPN are input to the transmission-power controller 108.

Among pieces of transmission data transmitted by the terminal, data to be transmitted to the macro base station is input to the first data-signal generating unit 104, and data to be transmitted to the LPN is input to the second data-signal generating unit 105.

The first data-signal generating unit 104 receives the transmitted data, and also receives information about the allocated frequency and the MCS applied to a signal, from the received-signal separating unit 103. The first data-signal generating unit 104 performs error correction coding, modulation, DFT processing, mapping, and IDFT processing on the transmitted data, generates a DFT-S-OFDM (Discrete Fourier Transform spread Orthogonal Frequency Division Multiplexing) signal, and inputs the resulting signal to the first wireless transmission unit 106. Similarly, the second data data-signal generating unit 105 performs error correction coding, modulation, and mapping on the transmitted data by using the information about the MCS and the allocated frequency which is received from the received-signal separating unit 103, and inputs the resulting signal to the second wireless transmission unit 107. Instead of DFT-S-OFDM signals, the signals generated as OFDM signals by the first data-signal generating unit 104 and the second data-signal generating unit 105 are also applicable to the present invention.

The first wireless transmission unit 106 performs D/A (Digital to Analog) conversion and upconversion to a carrier frequency used between the terminal and the macro base station, on the signal received from the first data-signal generating unit 104, and inputs the resulting signal to the transmission-power controller 108. The second wireless transmission unit 107 performs D/A conversion and upconversion to the carrier frequency used between the LPN and the terminal, on the signal received from the second data-signal generating unit 105, and inputs the resulting signal to the transmission-power controller 108.

Figure 5:
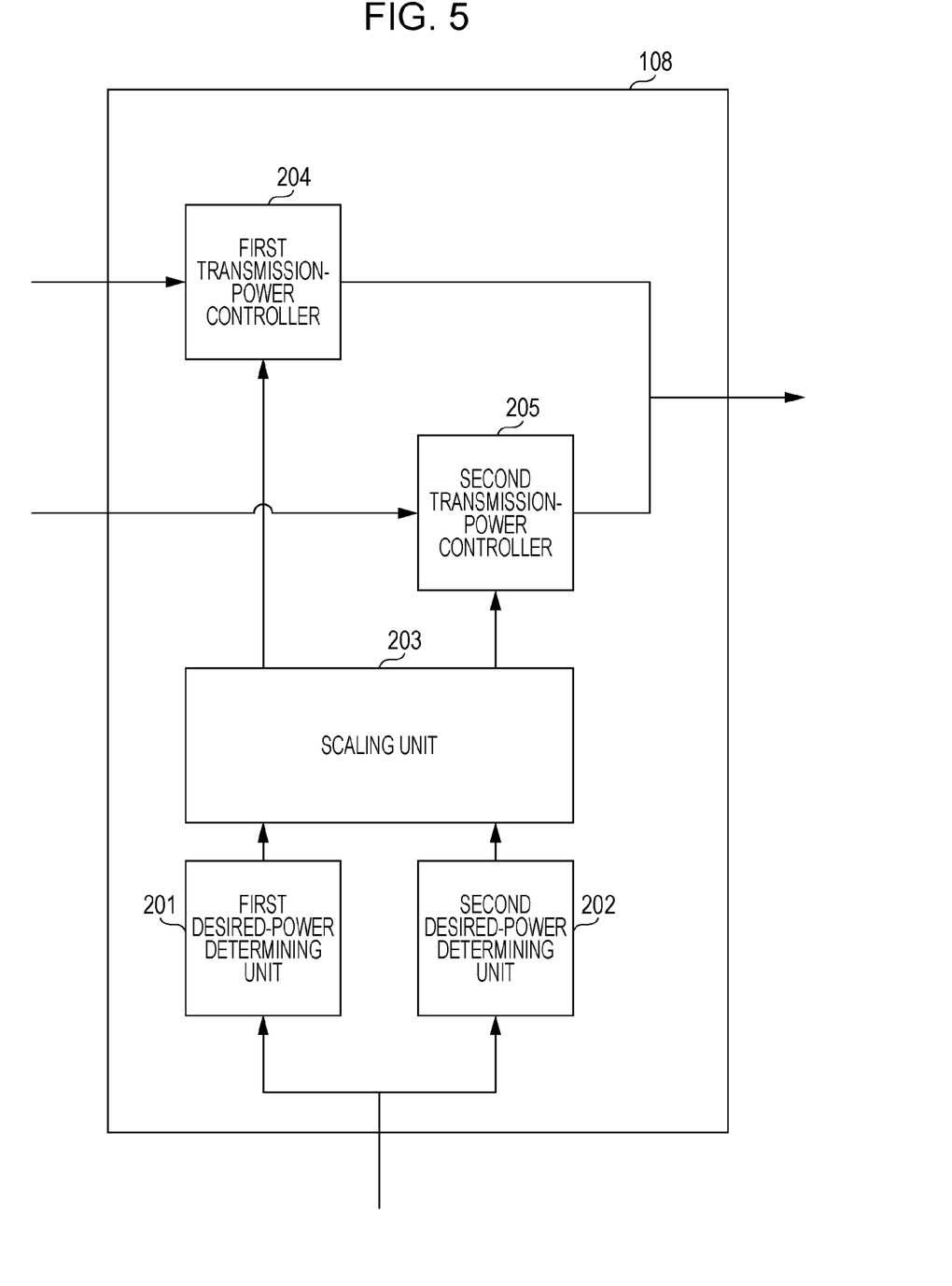
FIG. 5 is a schematic view illustrating an exemplary internal configuration of a transmission-power controller of the terminal according to the first embodiment of the present invention.

The transmission-power controller 108 distributes the transmission power to the signal that is to be transmitted to the macro base station and that is received from the first wireless transmission unit 106 and to the signal that is to be transmitted to the LPN and that is received from the second wireless transmission unit 107, according to a criterion described below, and transmits the signals from the transmission antenna 109. FIG. 5 illustrates an exemplary internal configuration of the transmission-power controller 108. The transmission-power controller 108 includes a first desired-power determining unit 201, a second desired-power determining unit 202, a scaling unit 203, a first transmission-power controller 204, and a second transmission-power controller 205.

The first desired-power determining unit 201 calculates the desired transmission power $p_{PUSCH,macro}(i)$ by using Expression (1) for the CC which is used in transmission to the macro base station and which is denoted by using c=macro, and inputs the resulting value to the scaling unit 203. Similarly, the second desired-power determining unit 202 calculates the desired power $P_{PUSCH,small}(i)$ by using Expression (1) for the CC which is used in transmission to the LPN and which is denoted by using c=small, and inputs the resulting value to the scaling unit 203. The symbols $P_{0\#PUSCH,c}(i)$, $\alpha_c(j)$, and $\Delta_{TF,c}(i)$ which are used in Expression (1) represent values transmitted from either one of the macro base station and the LPN through a higher layer (not illustrated), and $M_{PUSCH,c}(i)$ and $f_c(i)$ are received as control information from the received-signal separating unit 103.

The scaling unit 203 determines the transmission power of a signal to be transmitted in each of the CCs so that Expression (3) is satisfied by using $P_{PUSCH,macro}(i)$ and $P_{PUSCH,small}(i)$ which have been received, and $P_{CMAX}(i)$.

The scaling unit 203 calculates the scaling factor w(i) on the basis of Expression (3), and uses the resulting factor w(i) to input the transmission power setting value $p_1 = w(i) \cdot p_{PUSCH,macro}(i)$ to the first transmission-power controller 204 and input the transmission power setting value $p_2 = p_{PUSCH,small}(i)$ to the second transmission-power controller 205.

The first transmission-power controller 204 amplifies power of the signal that is to be transmitted to the macro base station and that is received from the first wireless transmission unit 106, in such a manner that the resulting power matches the transmission power setting value $p_1$ received from the scaling unit 203, and outputs the resulting signal to the transmission antenna 109. Similarly, the second transmission-power controller 205 amplifies power of the signal that is to be transmitted to the macro base station and that is received from the second wireless transmission unit 107, in such a manner that the resulting power matches the transmission power setting value $p_2$ received from the scaling unit 203, and outputs the resulting signal to the transmission antenna 109.

By using the terminal described above, while power is distributed to an LPN with high priority, simultaneous transmission to a macro base station and the LPN may be achieved.

The terminal in FIG. 4 employs a configuration in which transmission is performed in such a manner that a CC is used for the macro base station and that another CC is used for the LPN. The present invention may be applied to a case in which multiple CCs are used for each of the base station apparatuses (the macro base station and the LPN). In this case, in the terminal in FIG. 4, the first data-signal generating unit 104 generates a signal for each CC used in transmission to the macro base station, and inputs the generated signal to the first wireless transmission unit 106. The second data-signal generating unit 105 generates a signal for each CC used in transmission to the LPN, and inputs the generated signal to the second wireless transmission unit 107. The upconversion processing performed in the first wireless transmission unit 106 and the second wireless transmission unit 107 may be performed on all of the received signals in batch processing, or may be performed independently for each CC. The first desired-power determining unit 201 in FIG. 5 applies Expression (1) to CCs which are used in transmission to the macro base station and which are denoted by using c=m1, m2, . . . , mM, and calculates $P_{PUSCH,m1}(i)$, $P_{PUSCH,m2}(i)$, . . . , and $P_{PUSCH,mM}(i)$. The second desired-power determining unit 202 applies Expression (1) to CCs which are used in transmission to the LPN and which are denoted by using c=s1, s2, . . . , sN, and calculates $P_{PUSCH,s1}(i)$, $P_{PUSCH,s2}(i)$, . . . , and $P_{PUSCH,sN}(i)$. The scaling unit 203 performs power scaling so that the following expressions (4) and (5) are satisfied.

[Math 4]

$$\sum_{c=m1}^{mM} \{w_s(i) \cdot p_{PUSCH,c}(i)\} \leq p_{CMAX}(i) \quad (4)$$

[Math 5]

$$\sum_{c=s1}^{sN} \{w_m(i) \cdot p_{PUSCH,c}(i)\} \leq p_{CMAX}(i) - \sum_{c=m1}^{mM} \{w_s(i) \cdot p_{PUSCH,c}(i)\} \quad (5)$$

The first transmission-power controller 204 amplifies the transmission power of signals corresponding to the CCs denoted by using c=m1, m2, . . . , mM, in such a manner that the amplified transmission power satisfies the expressions $p_{m1}=w_m(i) \cdot p_{PUSCH,m1}(i)$, $P_{m2}=w_m(i) \cdot p_{PUSCH,m2}(i)$, . . . , and $p_{mM}=w_m(i)\ p_{PUSCH,mM}(i)$. The second transmission-power controller 205 amplifies the transmission power of signals corresponding to the CCs denoted by using c=s1, s2, . . . , sM, in such a manner that the amplified transmission satisfies the expressions $p_{s1}=w_s(i) \cdot p_{PUSCH,s1}(i)$, $p_{s2}=w_s(i) \cdot p_{PUSCH,s2}(i)$, . . . , and $p_{sN}=w_s(i) \cdot p_{PUSCH,sN}(i)$. By performing such transmission power control, while the power is distributed to signals transmitted to the LPN with high priority, the surplus power is distributed to the macro base station, achieving scaling which does not cause degradation of the communication quality of a signal transmitted with low transmission power.

In the first embodiment described above, a configuration in which data signals PUSCH are simultaneously transmitted to the macro base station and the LPN is described. Further, PUCCH (Physical Uplink Control CHannel) which is control information transmitted to the macro base station or the LPN through an uplink may be simultaneously transmitted.

In this case, the 3GPP system of the related art performs scaling for satisfying the following expression (6), instead of scaling for satisfying Expression (2).

[Math 6]

$$\sum_{c} w(i) \cdot p_{PUSCH,c}(i) \leq (p_{CMAX}(i) - p_{PUCCH}(i)) \quad (6)$$

The symbol $p_{PUCCH}(i)$ represents a true value of the desired transmission power of PUCCH. Expression (6) indicates scaling performed in a case in which the priority for a control signal is higher than that for a data signal. Also in the present invention, the following expressions (7) and (8) achieve similar scaling.

[Math 7]

$$w_s(i) \cdot p_{PUSCH,small}(i) \leq (p_{CMAX}(i) - p_{PUCCH}(i)) \quad (7)$$

[Math 8]

$$w_m(i) \cdot p_{PUSCH,macro}(i) \leq (p_{CMAX}(i) - p_{PUCCH}(i) - w_s(i) \cdot p_{PUSCH,small}(i)) \quad (8)$$

The symbol $p_{PUCCH}(i)$ described in Expressions (7) and (8) may represent the desired transmission power of PUCCH transmitted to the macro base station, may represent the desired transmission power of PUCCH transmitted to the LPN, or may represent the sum of the desired transmission power of PUCCHs transmitted to both of the macro base station and the LPN simultaneously.

In simultaneous transmission of multiple PUCCHs to the macro base station and the LPN, in the case where the sum of the desired transmission power of the PUCCHs is larger than $P_{CMAX}$, scaling using different priorities may be also performed on the desired transmission power of the PUCCHs as in Expression (3). In addition, the PUCCHs have different information priorities depending on the information to be transmitted, such as a retransmission request or a scheduling request. Therefore, PUCCH containing information having high priority, such as a retransmission request, may be subjected to scaling with priority higher than that of other PUCCH.

Expressions (7) and (8) allow the terminal to distribute the transmission power available to the terminal by using priority in the order of satisfying the expression, PUCCH>(PUSCH transmitted to the LPN)>(PUSCH transmitted to the macro base station). As a result, while the communication quality of PUCCH containing information of high importance is insured, the transmission power may be distributed between the macro base station and the LPN in consideration of efficiency of power use.

In the first embodiment, a configuration in which, when the terminal is simultaneously connected to the macro base station and the LPN, the transmission power is distributed to the LPN with high priority is described. In scaling of the transmission power of a signal to the macro base station, in the case where the value of scaling factor w(i) is smaller than a predetermined threshold, the process of transmitting the signal may be canceled. In this case, the signal to the macro base station fails to be transmitted. In contrast, power consumption may be saved in the terminal, and interference to other communication apparatuses may be reduced.

Second Embodiment

In the first embodiment, a configuration in which, in simultaneous transmission of signals to the macro base station and the LPN in different CCs, the transmission power is allocated to a signal transmitted to the LPN with high priority is described. This configuration is effective in that, when the transmission power of a signal to the LPN is extremely low compared with that of a signal to the macro base station, efficiency in power use is improved. However, when the transmission power of a signal to the LPN is not so different from that of a transmission signal to the macro base station, giving high priority to a signal to the LPN may cause the transmission power of a signal transmitted to the macro base station to be scaled by using a small weight, resulting in remarkable reduction in reception quality.

Figure 6:
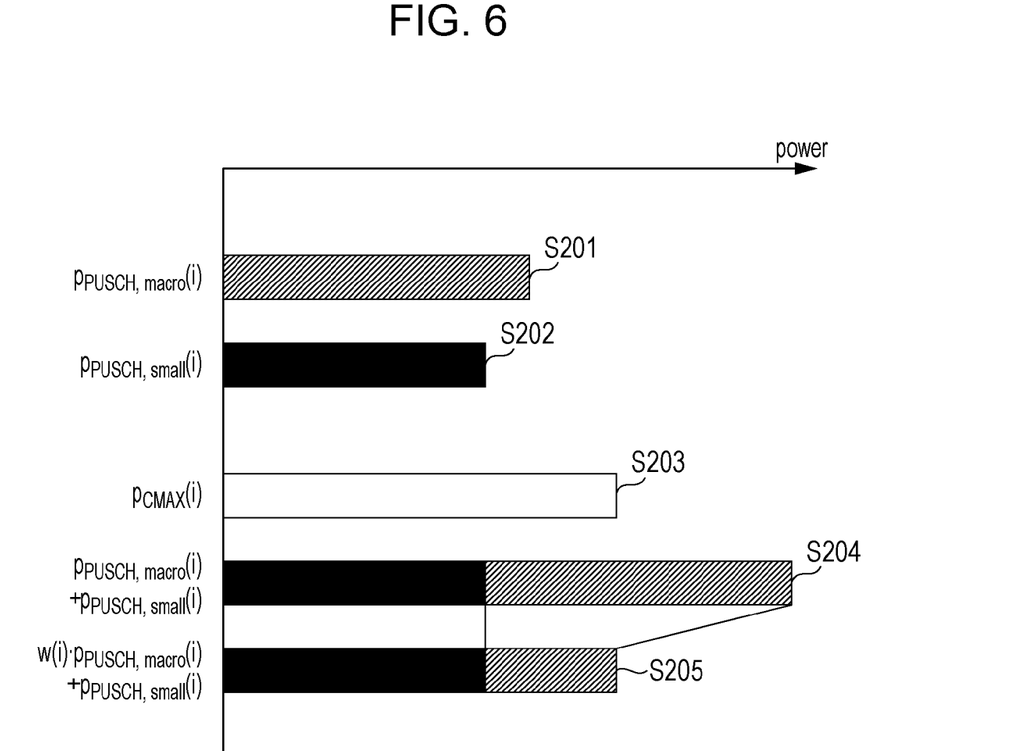
FIG. 6 is another diagram illustrating exemplary transmission power used when scaling according to the first embodiment of the present invention is performed.

FIG. 3 illustrates scaling in which power is distributed to the LPN with high priority when the desired transmission power $p_{PUSCH,small}(i)$ of a data signal to the LPN is smaller than the desired transmission power $p_{PUSCH,macro}(i)$ of a data signal to the macro base station. In contrast, unlike the case in FIG. 3, FIG. 6 illustrates a case in which there is not a great difference between $p_{PUSCH,macro}(i)$ (S201) and $p_{PUSCH,small}(i)$ (S202). In this case, $(p_{PUSCH,macro}(i)+p_{PUSCH,small}(i))$ (S204) exceeds the maximum transmission power $p_{CMAC}(i)$ (S203) of the terminal. Therefore, when scaling is performed by using Expression (3), the result value is $(w(i) \cdot p_{PUSCH,macro}(i)\ p_{PUSCH,small}(i))$ (S205). Since $p_{PUSCH,small}(i)$ (S202) is large, the value of w(i) is small, and the value of $w(i) \cdot p_{PUSCH,macro}(i)$ is extremely small. In this situation, a signal to the LPN may satisfy target reception power $P_{0\#PUSCH,small}(i)$ of the LPN, and the received signal may be correctly decoded with high probability. In contrast, a signal received by the macro base station may be incorrectly decoded with high probability because the transmission power is much lower than target reception power $P_{0\#PUSCH,macro}(j)$. In this situation, when minimum reception quality is to be insured in the macro base station, an upper limit needs to be set to allocation of power to a signal to the LPN, and power above a certain level needs to be allocated to a signal to the macro base station.

A terminal according to a second embodiment which allocates the transmission power to the LPN with high priority while the minimum reception power is allocated in each of the base stations will be described. The terminal according to the second embodiment may be achieved by using the same block configurations as those of the terminal illustrated in FIGS. 4 and 5 according to the first embodiment. Since the function of the scaling unit 203 in FIG. 5 is different, description will be made by using a scaling unit 203a.

The scaling unit 203a has a value $W_{limit}$ which is the lower limit of a scaling factor which may be set in advance in scaling of the transmission power. For example, when the minimum power to be allocated to transmission of a signal to the macro base station is half of the desired transmission power $p_{PUSCH,macro}(i)$ obtained through calculation using Expression (1), $W_{limit}=0.5$. The process performed by the scaling unit 203a will be described by using the flowchart illustrated in FIG. 7. The scheduling unit 203a receives the desired transmission power $p_{PUSCH,macro}(i)$ of a signal to be transmitted to the macro base station, from the first desired-power determining unit 201, and receives the desired transmission power $p_{PUSCH,small}(i)$ of a signal to be transmitted to the LPN, from the second desired-power determining unit 202 (S10). Whether or not the sum of $p_{PUSCH,macro}(i)$ and $p_{PUSCH,small}(i)$ which have been received is larger than the maximum transmission power $p_{CMAX}(i)$ of the terminal is determined (S11). If the sum is smaller than the maximum transmission power $p_{CMAX}(i)$ (S11-NO), scaling is not performed. Accordingly, the scaling factor $w_m(i)$ for a signal to be transmitted to the macro base station is set at 1, and the scaling factor $w_s(i)$ for a signal to be transmitted to the LPN is set at 1 (S12). If the sum of $p_{PUSCH,macro}(i)$ and $p_{PUSCH,small}(i)$ is larger than $p_{CMAX}(i)$ (S11-YES), $w_s(i)$ is calculated so that the following expression (9) is satisfied (S13).

[Math 9]

$$w_s(i) \cdot p_{PUSCH,small}(i) \leq p_{CMAX}(i) - W_{limit} \cdot p_{PUSCH,macro}(i) \quad (9)$$

Figure 7:
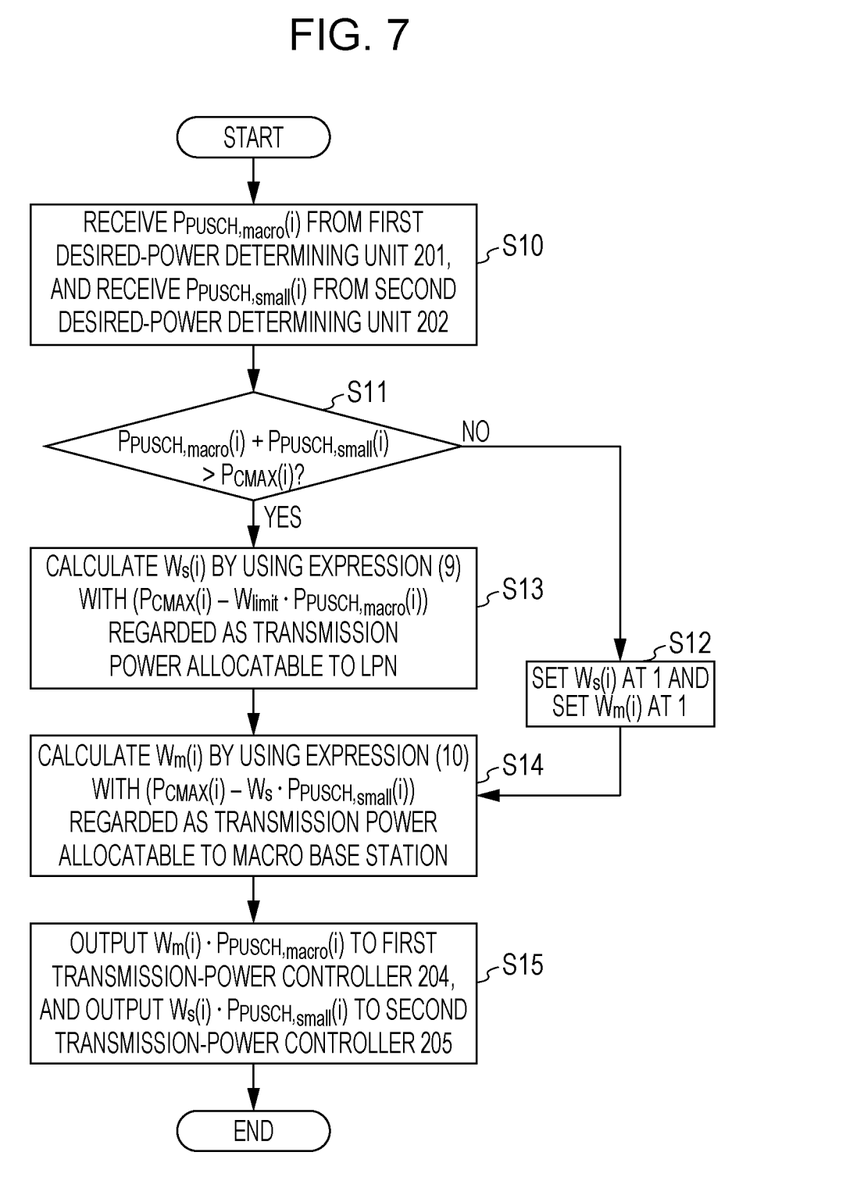
FIG. 7 is a flowchart illustrating a process performed by a scaling unit of a terminal according to a second embodiment of the present invention.

In Expression (9), the lower limit $W_{limit} \cdot p_{PUSCH,macro}(i)$ which may be set as the transmission power to the macro base station is subtracted from $p_{CMAX}(i)$, whereby the transmission power which may be allocated to the LPN is set to the right side of the expression. Then, the lower limit scaling factor $w_s(i)$ is calculated as the transmission power to the LPN. The calculated $w_s(i)$ is used to calculate $w_m(i)$ so that the following expression (10) is satisfied (S14).

[Math 10]

$$w_m(i) \cdot p_{PUSCH,macro}(i) \leq p_{CMAX}(i) - w_s(i) \cdot p_{PUSCH,small}(i) \quad (10)$$

In Expression (10), $w_s(i)$ calculated on the basis of Expression (9) is used to set the transmission power which may be allocated to the macro base station to the right side of the expression. Then, the lower limit scaling factor $w_m(i)$ is calculated as the transmission power to the macro base station. On the basis of the calculated $w_s(i)$ and $w_m(i)$, the scaling unit 203a outputs the transmission power $p_1=w_m(i) \cdot p_{PUSCH,macro}(i)$ of a signal transmitted to the macro base station, to the first transmission-power controller 204, and outputs the transmission power $p_2=w_s(i) \cdot p_{PUSCH,small}(i)$ of a signal transmitted to the LPN, to the second transmission-power controller 205 (S15).

Thus, scaling is performed by using $w_s(i)$ and $w_m(i)$ which are calculated on the basis of Expressions (9) and (10), whereby the transmission power may be allocated to a signal transmitted to the LPN with high priority while lower limit transmission power is allocated to a signal transmitted to the macro base station.

In Expression (9), when $w_s(i)$ is smaller than $W_{limit}$, the minimum transmission power for simultaneous transmission to the macro base station and the LPN fails to be allocated. Accordingly, a process of allocating no transmission power to (not transmitting) either one of the signals may be performed.

In the second embodiment, $W_{limit}$ is set in order to allocate the minimum transmission power to a base station having low priority, and scaling is performed by using Expressions (9) and (10). Another method may be used to perform scaling for giving high priority to the LPN. For example, instead of Expressions (9) and (10), scaling may be performed so that the following expression (11) is satisfied.

[Math 11]

$$w(i) \cdot \{p_{PUSCH,small}(i) + R_{macro} \cdot p_{PUSCH,macro}(i)\} \leq p_{CMAX}(i) \quad (11)$$

The range of $R_{macro}$ is determined as $0 \leq R_{macro} \leq 1$. The scaling factor w(i) satisfying Expression (11) causes the transmission power to the macro base station to be set at $w(i) \cdot R_{macro} \cdot p_{PUSCH,macro}(i)$, and causes the transmission power to the LPN to be set at the transmission power $w(i) \cdot p_{PUSCH,small}(i)$, (whereby the priority of the transmission power may be given at a ratio of 1:$R_{macro}$ to a signal to the macro base station and a signal to the LPN. The value of $R_{macro}$ may be a fixed value determined in the system, may be a value obtained through calculation based on a ratio of $p_{PUSCH,macro}(i)$ to $p_{PUSCH,small}(i)$, or may be a value obtained though calculation based on a ratio of path loss for the macro base station to path loss for the LPN.

Third Embodiment

In the first embodiment and the second embodiment, a configuration in which, when one macro base station and one LPN are present, the transmission power is distributed to the LPN with high priority is described. In a third embodiment, distribution of the transmission power which is made when a terminal is simultaneously connected to three or more base stations will be described.

Figure 8:
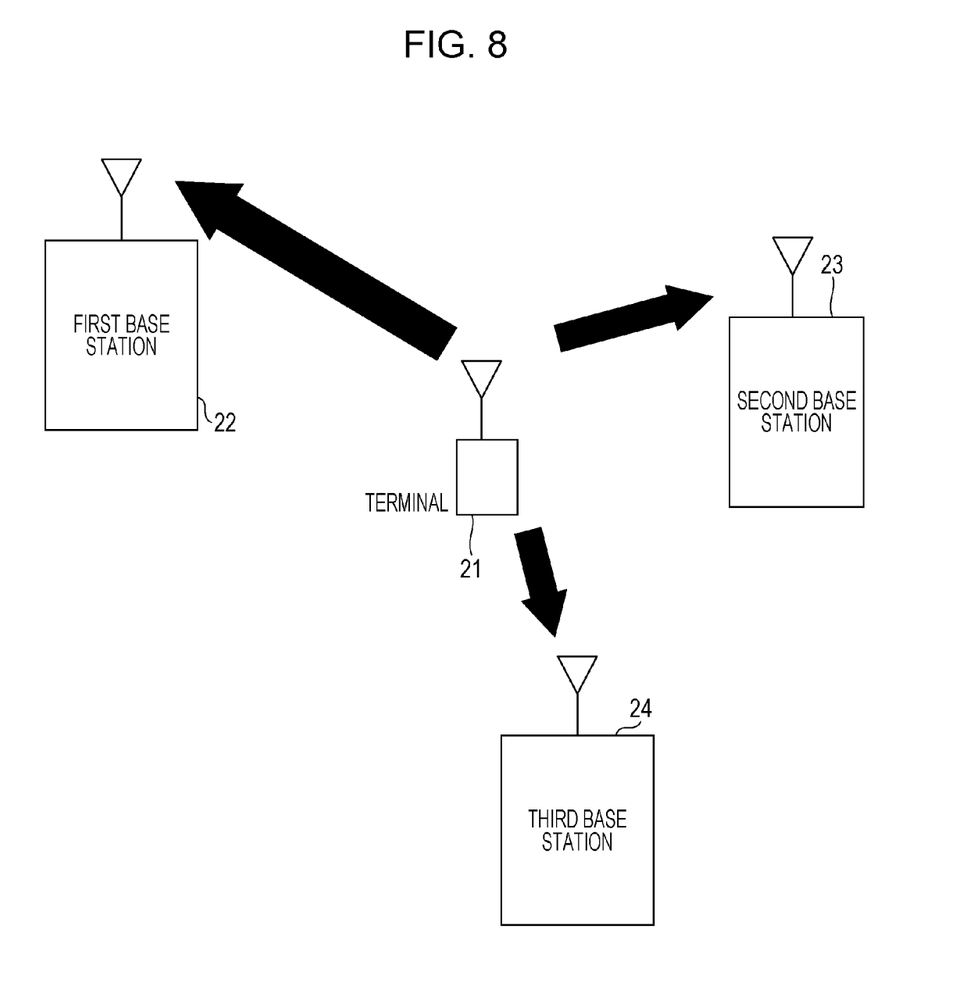
FIG. 8 is a schematic view illustrating an exemplary transmission relationship between a terminal and base stations according to a third embodiment of the present invention.

FIG. 8 illustrates an exemplary system configuration according to the third embodiment. A terminal 21 simultaneously transmits signals to three base station apparatuses, a first base station 22, a second base station 23, and a third base station 24. The three base stations may be, for example, a macro base station and two LPNs, three or more types of base stations whose cell radiuses are different from each other, or three base stations of the same type.

In the terminal 21, the desired transmission power, which is used to achieve predetermined reception power, of a signal transmitted to the first base station 22, that to the second base station 23, and that to the third base station 24 are different from each other. Assume that the first base station 22 has the highest desired transmission power; the second base station 23 has the second highest desired transmission power; and the third base station 24 has the lowest desired transmission power. In this environment, scaling described below is performed when the sum of the desired transmission power of signals to the three base stations exceeds the maximum transmission power of the terminal.

The desired transmission power (decibel value) for the nth base station which is calculated by using Expression (1) for a sub-frame determined by the index i is represented by $P_{PUSCH,n}(i)$ (the true value is represented by $p_{PUSCH,n}(i)$), and the maximum transmission power (true value) of the terminal is represented by $p_{CMAX}(i)$. The expressions $P_{PUSCH,1}(i) > P_{PUSCH,2}(i) > P_{PUSCH,3}(i)$ and $p_{PUSCH,1}(i) \cdot p_{PUSCH,2}(i) + p_{PUSCH,3}(i) > p_{CMAX}(i)$ hold. At that time, the terminal according to the present embodiment performs scaling so that Expressions (12), (13), and (14) are satisfied.

[Math 12]

$$w_3(i) \cdot p_{PUSCH,3}(i) \leq p_{CMAX}(i) \quad (12)$$

[Math 13]

$$w_2(i) \cdot p_{PUSCH,2}(i) \leq p_{CMAX}(i) - w_3(i) \cdot p_{PUSCH,3}(i) \quad (13)$$

[Math 14]

$$w_1(i) \cdot p_{PUSCH,1}(i) \leq p_{CMAX}(i) - w_2(i) \cdot p_{PUSCH,2}(i) - w_3(i) \cdot p_{PUSCH,3}(i) \quad (14)$$

The symbol $w_n(i)$ ($0 \leq w_n(i) \leq 1$) represents a scaling factor for a signal transmitted to the xth base station. Expressions (12), (13), and (14) allow the transmission power to be distributed with higher priority in the ascending order of the desired transmission power.

In the case where the concept described above is generalized, and where the terminal is connected to N base stations, the expressions used in scaling may be expressed as follows.

[Math 15]

$$w_N(i) \cdot p_{PUSCH,N}(i) \leq p_{CMAX}(i) \quad (15)$$

[Math 16]

$$w_n(i) \cdot p_{PUSCH,n}(i) \leq p_{CMAX}(i) - \sum_{x=n+1}^{N} w_x(i) \cdot p_{PUSCH,x}(i) \quad (16)$$

The expression $p_{PUSCH,n}(i) > p_{PUSCH,n+1}(i)$ is assumed.

Figure 9:
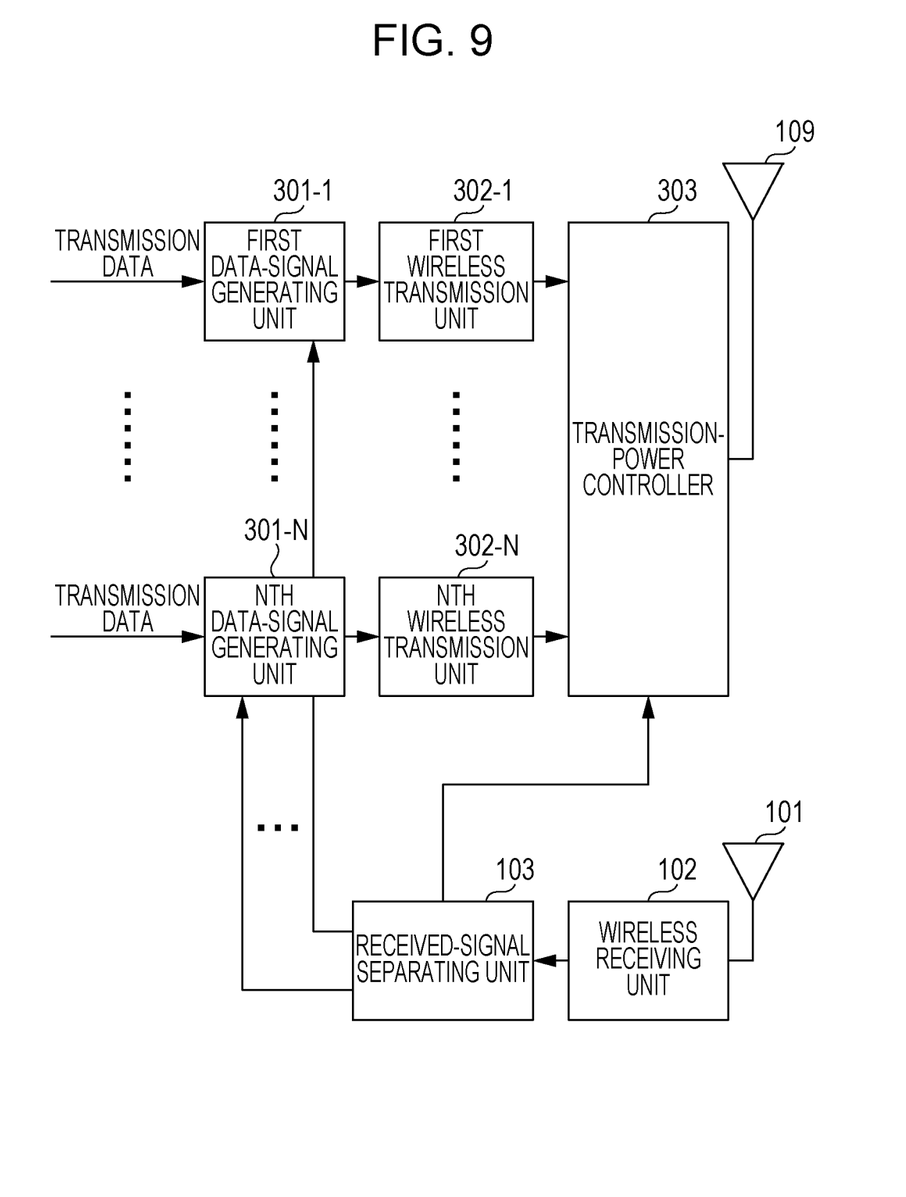
FIG. 9 is a schematic view illustrating an exemplary configuration of the terminal according to the third embodiment of the present invention.

FIG. 9 illustrates an exemplary configuration of the terminal according to the third embodiment of the present invention. The terminal in FIG. 9 has a configuration similar to the terminal in FIG. 4. However, in the configuration, the first data-signal generating unit 104 and the second data-signal generating unit 105 are omitted, and a first data-signal generating unit 301-1 to an nth data-signal generating unit 301-N are added. In addition, the first wireless transmission unit 106 and the second wireless transmission unit 107 are omitted, and a first wireless transmission unit 302-1 to an nth data-signal generating unit 302-N are added. Further difference is that a transmission-power controller 303 is used instead of the transmission-power controller 108. The other blocks denoted with the same reference numerals have identical functions. The received-signal separating unit 103 extracts pieces of control information, the number of which is N, for the first base station to the Nth base station, and inputs the extracted information to the first data-signal generating unit 301-1 to the nth data-signal generating unit 301-N and to the transmission-power controller 303.

The nth data-signal generating unit 301-$n$ (n=1, 2, . . . , N) receives transmission data to be transmitted to the nth base station, and also receives information about an allocated frequency and MCS applied to a signal, from the received-signal separating unit 103. The nth data-signal generating unit 301-$n$ performs error correction coding, modulation, DFT processing, mapping, and IDFT processing on the transmission data, generates a DFT-S-OFDM signal, and inputs the resulting signal to the nth wireless transmission unit 302-$n$ (n=1, 2, . . . , N).

The nth wireless transmission unit 302-$n$ subjects the signal received from the nth data-signal generating unit 301-$n$ to D/A conversion and upconversion to the carrier frequency used between the terminal and the nth base station, and inputs the resulting signal to the transmission-power controller 303.

The transmission-power controller 303 distributes the transmission power to the signals received from the first wireless transmission unit 302-1 to the Nth wireless transmission unit 302-N by using a criterion described below, and transmits the signals from the transmission antenna 109.

Figure 10:
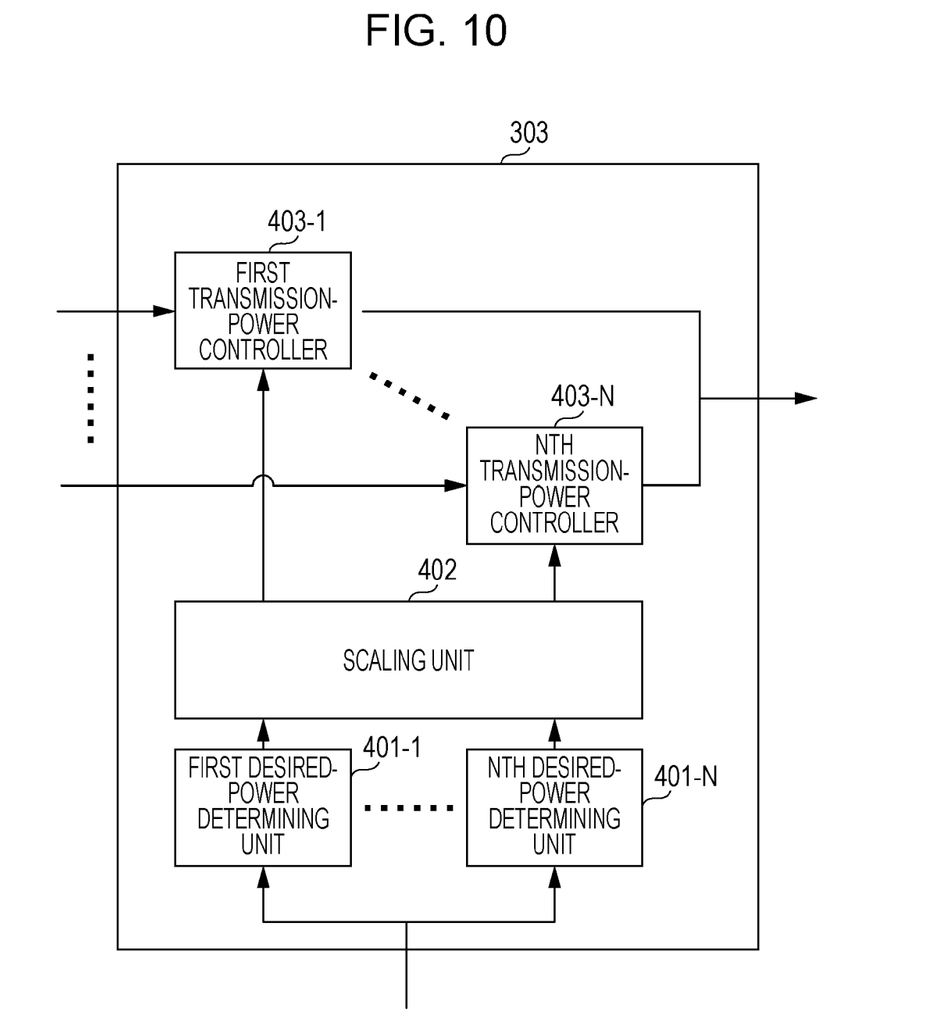
FIG. 10 is a schematic view illustrating an exemplary internal configuration of a transmission-power controller of the terminal according to the third embodiment of the present invention.

FIG. 10 illustrates an exemplary internal configuration of the transmission-power controller 303. The transmission-power controller 303 includes an nth desired-power determining unit 401-$n$ (n=1, 2, . . . , N), a scaling unit 402, and an nth transmission-power controller 403-$n$ (n=1, 2, . . . , N).

A nth desired-power determining unit 401-$n$ calculates the desired transmission power $P_{PUSCH,n}(i)$ by using Expression (1) for a CC which is used by a signal that is transmitted to the nth base station and that is received from the nth wireless transmission unit 302-$n$ and which is denoted by using c=n, and inputs the resulting value to the scaling unit 402.

The symbols $P_{0\#PUSCH,c}(j)$, $\alpha_c(j)$, and $\Delta_{TF,c}(i)$ which are used in Expression (1) represent values transmitted from either one of the base stations through a higher layer (not illustrated), and $M_{PUSCH,c}(i)$ and $f_c(i)$ are received as control information from the received-signal separating unit 103.

The scaling unit 402 has the maximum transmission power $P_{CMAX}(i)$ of the terminal, and receives $P_{PUSCH,n}(i)$. The scaling unit 402 sorts the received values $P_{PUSCH,n}(i)$ in the descending order so as to regard the sorted values as $P'_{PUSCH,n'}(i)$ (n'=1, 2, . . . , N), and uses the true values ($p'_{PUSCH,n'}(i)$ (n'=1, 2, . . . , N) of $P'_{PUSCH,n'}(i)$ to calculate scaling factors $w_n(i)$ so that Expressions (17) and (18) are satisfied.

[Math 17]

$$w_N(i) \cdot p'_{PUSCH,N}(i) \le p_{CMAX}(i) \quad (17)$$

[Math 18]

$$w_{n'}(i) \cdot p'_{PUSCH,n'}(i) \le p_{CMAX}(i) - \sum_{x=n'+1}^{N} w_x(i) \cdot p'_{PUSCH,x}(i) \quad (18)$$

The calculated value $w_n(i) \cdot p'_{PUSCH,n}(i)$ is input to the nth transmission-power controller 403-$n$ as the transmission power $p_n$ corresponding to the nth base station for which the value $p'_{PUSCH,n}(i)$ is calculated.

An nth transmission-power controller 403-$n$ amplifies the power of a signal which is to be transmitted to the nth base station and which is received from the nth wireless transmission unit 302-$n$ so that the amplified power matches the transmission power setting value $p_n$ received from the scaling unit 402, and outputs the resulting signal to the transmission antenna 109.

Use of the terminal described above achieves simultaneous transmission to multiple base stations in a state in which the power is distributed to a signal transmitted to a base station whose desired transmission power is small, with high priority.

In the present invention, scaling is performed so that higher priority is given in the descending order of $p_{PUSCH,c}(i)$ calculated for each base station serving as a receiving station. When one base station uses multiple CCs for transmission, multiple values $p_{PUSCH,c}(i)$ may be calculated. At that time, scaling may be performed so that higher priority is given to the CCs in the descending order of $p_{PUSCH,c}(i)$. Alternatively, the sum of the values $p_{PUSCH,c}(i)$ may be calculated for each base station serving as a receiving station, and a scaling factor may be calculated for each base station on the basis of the calculated sum of transmission power.

In the present invention, scaling is performed so that higher priority is given in the descending order of calculated values $p_{PUSCH,n}(i)$. Higher priority may be given in accordance with the types of base stations. For example, when the terminal is connected to a macro base station and two LPNs, scaling may be performed so that the same priority is given to the transmission power of signals transmitted to the two LPNs and that the transmission power of the signals is equal to or smaller than the maximum transmission power. After that, scaling may be performed on the transmission power of a signal to the macro base station so that the transmission power of the signal is equal to or smaller than the surplus power.

In the present invention, scaling is performed so that higher priority is given in the descending order of calculated values $p_{PUSCH,n}(i)$. Scaling may be performed on the basis of another criterion. For example, a different priority may be set on the basis of the number of allocated RBs for a signal transmitted to each base station. In this case, as in Expression (1), the desired transmission power of each signal increases in such a manner as to be proportional to the number of RBs $M_{PUSCH,c}(i)$. Therefore, it is possible to distribute the transmission power with high priority to a signal using a larger number of RBs and having higher desired transmission power. Similarly, a different priority may be set on the basis of the propagation loss (path loss) for a base station. In this case, as in Expression (1), a signal having larger path loss $PL_c$ has higher desired transmission power. Therefore, it is possible to distribute the transmission power with high priority to a signal having higher desired transmission power.

In the present invention, a configuration in which, when CA is used to transmit signals to multiple base stations simultaneously, the transmission power is distributed with high priority to a certain base station in order to improve efficiency in power use is described. In these embodiments, the error rate of a signal to which the power is distributed with high priority is lower than that of another signal because of the nature thereof. When pieces of information having different priorities are to be transmitted, it is effective to transmit information having high priority as a signal to which the power is distributed with high priority. Examples of a signal having high priority include control signals, such as a retransmission request and a scheduling request, and also include a retransmission signal and a systematic bit used in error correction coding.

A program operating on the terminal, the macro base station, and the LPN according to the present invention is a program (program causing a computer to function) for controlling a CPU or the like so that the functions of the embodiments according to the present invention are achieved. Information handled in these apparatuses is temporarily accumulated in a RAM during the process. After that, the information is stored in various types of ROM and HDD, is read by the CPU when necessary, and is modified/written. As a recording medium storing the program, any may be used, such as a semiconductor medium (for example, a ROM or a nonvolatile memory card), an optical recording medium (for example, a DVD, an MO, an MD, a CD, or a BD), or a magnetic recording medium (for example, a magnetic tape or a flexible disk).

Not only does execution of a loaded program achieve the functions of the embodiments described above, but also a cooperative process performed with an operating system, another application program, or the like on the basis of an instruction from the program may achieve the functions of the present invention. In distribution of the program on the market, a portable recording medium storing the program may be distributed, or the program may be transferred to a server computer connected through a network such as the Internet. In this case, a storage device of the server computer is included in the present invention.

Some or all of the terminal, the macro base station, and the LPN according to the embodiments described above may be achieved typically as an LSI which is an integrated circuit. The functional blocks of the terminal, the macro base station, and the LPN may be individually achieved as a chip, or some or all of the functional blocks may be achieved as a chip. The method for circuit integration is not limited to an LSI, and may be achieved by using a dedicated circuit or a general-purpose processor. When advance of semiconductor technology produces a technique for circuit integration which is replaced with an LSI, an integrated circuit produced using the technique may be used.

The embodiments of the present invention are described in detail with reference to the drawings. The specific configurations are not limited to the embodiments. For example, designs and the like which are made without departing from the gist of the present invention are also included in the scope of claims. For example, in the present invention, the three separate embodiments are described. A configuration in which two or more embodiments are combined with each other may be employed.

INDUSTRIAL APPLICABILITY

The present invention is favorable for a wireless communication apparatus and a wireless communication method.

REFERENCE SIGNS LIST 1 macro base station
2 LPN
3 terminal
10 macro cell
11 small cell
21 terminal
22 first base station apparatus
23 second base station apparatus
24 third base station apparatus
101 reception antenna
102 wireless receiving unit
103 received-signal separating unit
104 first data-signal generating unit
105 second data-signal generating unit
106 first wireless transmission unit
107 second wireless transmission unit
108 transmission-power controller
109 transmission antenna
201 first desired-power determining unit
202 second desired-power determining unit
203 scaling unit
204 first transmission-power controller
205 second transmission-power controller
301-$n$ nth data-signal generating unit
302-$n$ nth wireless transmission unit
303 transmission-power controller
401-$n$ nth desired-power determining unit
402 scaling unit
403-$n$ nth transmission-power controller

The invention claimed is:

1. A wireless communication apparatus comprising:
 transmission-power controller that:
  determines a first scaling factor so that a first value which is obtained by multiplying a first transmission power of a first data signal by the first scaling factor become equal to or less than a second value is obtained by subtracting a second transmission power of a second data signal from a predetermined value;
  scales the first transmission power by using the first scaling factor; and
  at the same time, transmits:
   the first data signal to a first base station apparatus with the first transmission power which is scaled by using the first scaling factor, and
   the second data signal to a second base station apparatus with the second transmission power.

2. The wireless communication apparatus according to claim 1,
 wherein the predetermined value indicates maximum transmission power available in data transmission in the wireless communication apparatus.

3. The wireless communication apparatus according to claim 2,
 wherein, in a case that the wireless communication apparatus transmits a control signal to the first base station apparatus or the second base station apparatus, the transmission-power controller distributes transmission power to the control signal in preference to the data transmission, and distributes the remaining transmission power as the maximum transmission power available in the data transmission.

4. The wireless communication apparatus according to claim 1,
 wherein the transmission-power controller distributes transmission power available in the wireless communication apparatus, by giving priority to the first data signal or the second data signal.

5. The wireless communication apparatus according to claim 4,
 wherein transmission power is distributed with high priority to a data signal transmitted to a base station apparatus having smaller propagation loss among propagation loss between the first base station apparatus and the wireless communication apparatus and propagation loss between the second base station apparatus and the wireless communication apparatus.

6. A wireless communication method applied for a wireless communication apparatus, the wireless communication method comprising:
 determining a first scaling factor so that a first value which is obtained by multiplying a first transmission power of a first data signal by the first scaling factor become equal to or less than a second value which is obtained by subtracting a second transmission power of a second data signal from a predetermined value;
 scaling the first transmission power by using the first scaling factor; and
 at the same time, transmitting:
  the first data signal to a first base station apparatus with the first transmission power which is scaled by using the first scaling factor, and
  the second data signal to a second base station apparatus with the second transmission power.

7. The wireless communication apparatus according to claim 1, wherein
 the transmission-power controller ensures minimum transmission power of the second data signal, and
 the transmission-power controller scales the first transmission power of the first data signal so that the sum of the minimum transmission power of the second data signal and the scaled transmission power of the first data signal may not exceed the predetermined value.

8. The wireless communication apparatus according to claim 7,
 wherein the transmission-power controller further scales the second transmission power of the second data signal so that the sum of the scaled transmission power of the first data signal and the scaled transmission power of the second data signal may not exceed the predetermined value.

* * * * *